April 28, 1953     E. SOKOLIK     2,636,306
COMBINED FISHHOOK AND LIVE BAIT CAGE
Filed Sept. 17, 1951
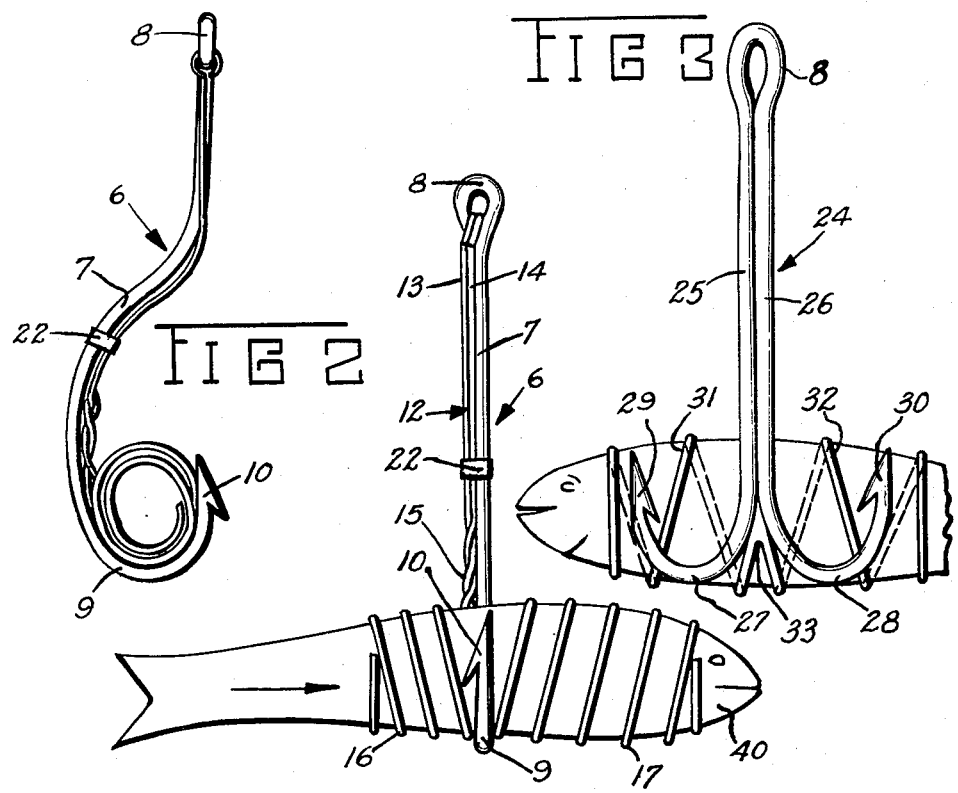
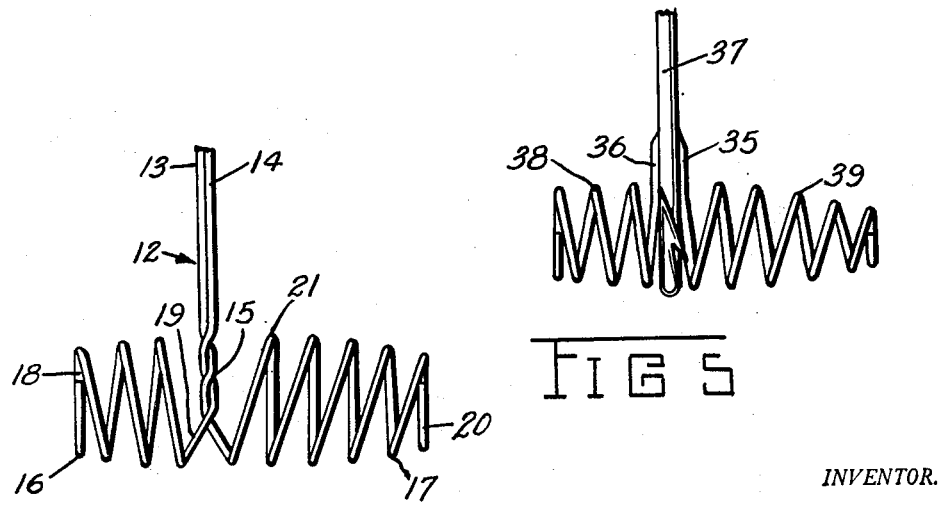
INVENTOR.
BY Edward Sokolik

UNITED STATES PATENT OFFICE 2,636,306

COMBINED FISHHOOK AND LIVE BAIT CAGE

Edward Sokolik, New Brighton, Minn.

Application September 17, 1951, Serial No. 246,970

6 Claims. (Cl. 43—44.4)

My present invention relates to improvements in a combined fish hook and live bait cage for still fishing.

In the art of fishing with live bait it is customary to secure the bait on a fish hook by passing the barbed beak of the hook through a portion of the bait, and preferably a relatively insensitive portion of the bait, so as to permit the bait to remain alive and attract other fish which are intended to be caught with the hook. The difficulty of fishing in this manner is that frequently the barbed beak of the hook, in passing through a part of the body of the bait such as a minnow, ruptures vital organs so that the bait dies in a short time and is, therefore, not particularly attractive to larger fish because its body movement has ceased. Moreover, when the bait is secured in the conventional manner, larger fish are able to take the bait and remove it from the hook, without being caught by the hook.

In the present invention I have provided a cage for live bait, and particularly live minnows, in the form of a spring wire structure which will surround the body of the bait so as to securely hold the bait without injury thereto, and this bait holder is adapted to be carried by the fish hook so as to hold the bait adjacent the barbed beak of the hook. The coiled spring wire which holds the bait should preferably be formed of polished metal so as to provide a series of reflective surfaces that will aid in attracting larger fish.

An object of the invention is to provide a fish hook with a cage for individual live bait that is adapted to be mounted on a fishing hook.

Another object is to provide a live bait holder formed of a pair of complementary coiled springs that are adapted to be carried by a fishing hook and extend transversely in the bight of the fish hook so as to hold live bait adjacent the barbed end of the hook.

A further object is to provide a live bait holder in the form of two sections of spring wires that are intertwined with each other and formed with truncated helically coiled end portions in axial alignment to hold live bait within the two coiled portions and which is adapted to be mounted on a fishing hook with the axis of the coils extending through the recurrently bent barked end of a fishing hook so as to hold live bait alive adjacent the barbed end of a fishing hook to attract larger fish and enable the latter to be caught on the barbed end of the hook.

Still another object is to provide a live bait holder in the form of two complementary sections of longitudinally coiled spring wires in axial alignment and disposed alongside a pair of twin bills opposed in a common plane and secured to the fish hook, thereby catching a fish whether taking the bait headwise or tailwise.

Other and further objects may become apparent from the following description and claims, and in the appended drawing in which:

Fig. 1 is a side elevation of the present invention used for holding live bait in combination with a fishing hook;

Fig. 2 is a side view of the structure shown in Fig. 1 with the live bait being omitted therefrom;

Fig. 3 shows a modified form of fish hook with which the invention may be used;

Fig. 4 is a side elevation of a portion of the bait holder without the minnow forming the present invention; and, Fig. 5 is a side elevation of a portion of another modified form of the bait holder forming the present invention.

Referring now to the several views of the drawing, the invention will be described in detail. Referring first to Figs. 1 and 2, shown therein, is a fish hook 6 consisting of a single stem portion 7 having an eye 8 at the upper end and a bill 9 having a barbed beak 10 at the lower end.

Seen in portion without the minnow therein in Fig. 4 and in combination with the fish hooks of Figs. 1 and 2, is a bait holder indicated by general reference character 12 composed of a pair of spring wires 13 and 14 which are intertwined with each other at 15. The wire 14 is formed into a truncated helical coil 16 convergent to the free end thereof and it will be noted that the direction of the turns of coil 16 are clockwise with respect to the intertwined portion 15. Wire 13 is formed into a truncated helical coil 17 convergent to the free end thereof and it will be noted that the direction of the turns are in a counterclockwise direction with respect to the intertwined portion 15. The sections 16 and 17 are disposed transversely of the bight of the bill 9 in axial alignment therewith. This arrangement of having both of the coils turned in the same direction from a center point is relatively important since they will both tend to uncoil when biting force by a fish is exerted thereupon permitting the upper jaw of the fish to sink into the bight of the bill 9, and be penetrated by the beak thereof. For purposes of identification, the outer end of coil 16 is referred to by reference character 18 while its base turn is referred to by reference character 19. Likewise the outer end of coil 17 is referred to by reference character 20 while the bast turn of this coil is referred to by reference character 21. As clearly shown in Figs. 1 and 2, the bait holder 12 is secured to the stem portion 7 of the hook by a band 22 and attached to the fish hook in the eyelet 8, although any other conventional form of fastening, including welding or soldering may be used. The barb on the beak 10 as shown may be in any radial position, but preferably externally of the bight of the bill 9 to prevent injury to the bait.

Referring to Fig. 3, the disclosure differs from the invention as previously discussed, with respect to the twin hook indicated by the general reference character 24 which carries the twin stemmed portion 25, 26, provided with a single eyelet 8 at the upper end thereof and opposed twin bills 27 and 28 having barbed beaks 29 and 30 at the lower end thereof. It will be further noted that the base coils 31 and 32 extend in the same direction from a common end of a single member 33 which is permanently welded onto the body of hook 24, at its crotch between the bills 27 and 28 and the coil sections are disposed along one side of the twin bills 27 and 28. Referring to Figs. 1 and 2, the stem 7 of the hook 6 may be long normally 4 or 5 times the width of the bill 9 and may be curved intermediately inwardly in a manner so that the upper portion of the shank is in axial alignment with the beak of the bill 9 thereby preventing the bill 9 from swinging laterally when hooking force is applied thereto by the fish taking the bait.

Fig. 5 shows a further modification in which two spring wires 35 and 36 are welded to the stem portion 37 of a fishing hook. The truncated coils 38 and 39 are substantially similar to those in the bail holder 12.

In operation, a live bait, disclosed as a minnow 40, is inserted within the coils of the holder, and this may be accomplished by inserting the bait through end 18 of coil 16, or by separating the base turns 19 and 21 and placing opposite ends of the fish within the separated coils 16 and 17. The cage 12 would be formed of a light reflective metal so that when the bait is encased within the coils, the coils themselves would be light reflective, and together with the movement of the bait, add attraction for larger fish. When a larger fish strikes at the bait, the coils will tend to unwind away from the stem portion of the hook, but will resist such movement and as the larger fish tries to overcome the resistance of the coils, it will be caught on the barbed beak 10 of hook 6 or on one of the barbed ends 29 and 30 of hook 24.

The advantage of this type of bait holder is that it permits the bait to remain alive and in an active condition so as to more readily attract game fish, and the spring coils of the bait holder, by simultaneously yielding, will permit the jaw of the game fish to be penetrated by the barbed beak 10, or 29 or 30, thereby catching the game fish.

My invention is defined in the terms of the appended claims.

What I claim is:

1. In combination with a fish hook comprising a shank means, bill means having barbed beak means formed at one end of the shank means and a connecting eyelet formed at the other end of the shank means, a cage adapted to hold individual live bait secured to the fish hook, said cage consisting of a pair of complementary sections of longitudinally coiled spring wires, each section having one end-portion of the wire thereof secured to the shank means and extending laterally therefrom substantially in axial alignment with the other section, one of said sections, commencing from the shank means, being coiled clockwise and the other section, commencing from said shank means, being coiled counter-clockwise, thereby providing an undershot connection of the sections to the shank means of the fish hook whereby the upper jaw of a fish taking the bait is not obstructed permitting the upper jaw to sink into the bight of the bill means of the fish hook, and barbed beak to simultaneously penetrate the jaw of the fish.

2. The structure defined in claim 1, in which the spring wires are circumferentially convergent to the free ends thereof thereby preventing escape of the live bait.

3. The structure defined in claim 1, in which the cage is formed of a material having light reflective characteristics to lure fish.

4. The structure defined in claim 1, in which the end-portions securing the sections of coiled spring wires to the shank means, are entwined and extended to the eyelet and are attached thereto.

5. In combination with a fish hook comprising a single shank, a single bill having a barbed beak formed at one end of the single shank and a connecting eyelet formed at the other end of the single shank, a cage adapted to hold live bait secured to the fish hook, said cage consisting of a pair of complementary sections of longitudinally coiled spring wires, each section having one end-portion of the wire coil secured to the single shank and extending laterally therefrom substantially in axial alignment with the other section and being disposed transversely in the bight of the single bill, one of said sections, commencing from the single shank, being coiled clockwise and the other section, commencing from said single shank, being coiled counter-clockwise, thereby providing undershot connection of the sections to the single shank of the fish hook whereby the upper jaw of a fish taking the bait is not obstructed permitting the upper jaw to sink into the bight of the single bill of the fish hook in such a manner that the barbed beak simultaneously penetrates the jaw of the fish.

6. In combination with a fish hook comprising twin shanks, opposed twin bills having barbed beaks formed at one end of the twin shanks and a connecting eyelet formed at the other end of the twin shanks, a cage adapted to hold live bait secured to the fish hook, said cage consisting of a pair of complementary sections of longitudinally coiled spring wires, each section having one end-portion of the wire coil secured to the twin shanks at the crotch therebetween and extending laterally therefrom substantially in axial alignment with the other section and being disposed along one lateral side of the twin bills, one of said sections, commencing from the twin shanks, being coiled clockwise and the other section, commencing from said twin shanks, being coiled counter-clockwise, thereby providing undershot connection of the sections to the twin shanks of the fish hook whereby the upper jaw of a fish taking the bait is not obstructed permitting the upper jaw to sink into the bight of one of the twin bills of the hook in such a manner that the barbed beak simultaneously penetrates the jaw of the fish.

EDWARD SOKOLIK.

References Cited in the file of this patent

UNITED STATES PATENTS

| Number | Name | Date |
| --- | --- | --- |
| 58,404 | Goodwin | Oct. 2, 1866 |
| 648,552 | Crane | May 1, 1900 |
| 1,338,856 | Cote | May 4, 1920 |
| 2,164,807 | Evans | July 4, 1939 |
| 2,513,548 | Buss | July 4, 1950 |